US 6,690,879 B2

(12) United States Patent
Uchida et al.

(10) Patent No.: US 6,690,879 B2
(45) Date of Patent: Feb. 10, 2004

(54) MAGNETIC RECORDING AND REPRODUCING APPARATUS OF HELICAL SCAN TYPE

(75) Inventors: Hirofumi Uchida, Osaka (JP); Masaru Higashionji, Osaka (JP); Takeshi Otsuka, Hyogo (JP); Keiichi Ishida, Hyogo (JP); Hiroshi Yohda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

(21) Appl. No.: 09/784,855

(22) Filed: Feb. 16, 2001

(65) Prior Publication Data

US 2001/0031134 A1 Oct. 18, 2001

(30) Foreign Application Priority Data

Feb. 16, 2000 (JP) .......................... 2000-037806
Feb. 16, 2000 (JP) .......................... 2000-037808

(51) Int. Cl.[7] ................................ H04N 5/91
(52) U.S. Cl. .......................... 386/67; 386/112
(58) Field of Search ................ 386/46, 67, 68, 386/111, 112, 109, 95, 96, 81, 116, 124

(56) References Cited

U.S. PATENT DOCUMENTS

| 5,787,221 A | * | 7/1998 | Matsumi et al. ............... 386/33 |
| 6,115,535 A | * | 9/2000 | Iwamoto et al. ............... 386/96 |
| 6,115,537 A | * | 9/2000 | Yamada et al. ............... 386/109 |
| 6,192,182 B1 | * | 2/2001 | Kawahara et al. ............ 386/46 |

FOREIGN PATENT DOCUMENTS

JP          11-503857          3/1999

* cited by examiner

Primary Examiner—Huy Nguyen
(74) Attorney, Agent, or Firm—RatnerPrestia

(57) ABSTRACT

Apparatus is adapted for recording and reproducing compressed video data in a selected one of two recording formats, of which a first format is for recording the compressed video data in N (N≧3, and representing an integer) number of tracks on a magnetic tape by dividing the video data into N number of groups, and a second format is for recording data, as auxiliary data independent from the compressed video data, in two of the tracks at both ends, and the compressed video data in (N−2) number of the tracks. In the second recording format, the recording is carried out by setting a data length of an error correction code for sync blocks longer than a data length of another error correction code for sync blocks in the first recording format.

14 Claims, 11 Drawing Sheets

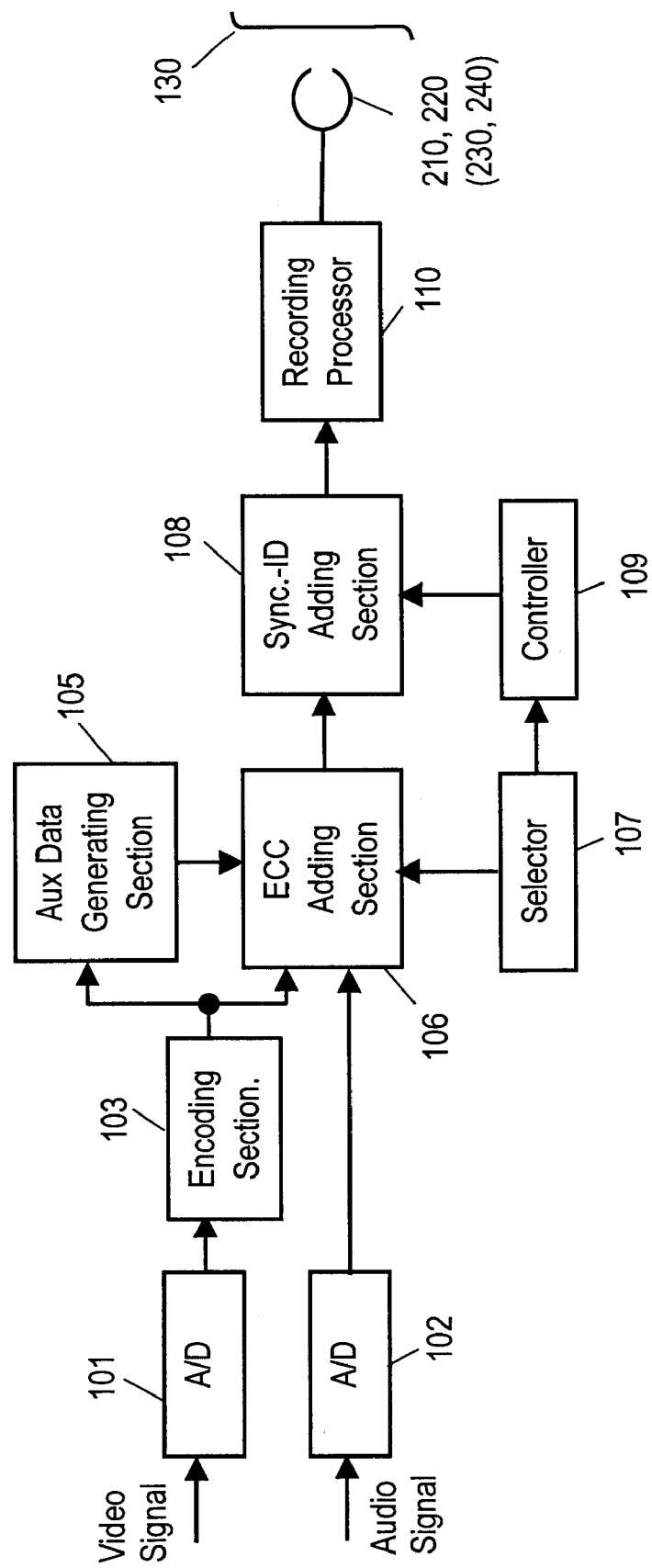

MAGNETIC RECORDING AND REPRODUCING APPARATUS OF HELICAL SCAN TYPE

BACKGROUND OF THE INVENTION

1. Field of the Invention

The present invention relates to recording and reproduction of a video signal, and in particular, it relates to a VCR of helical scan type.

2. Description of the Related Art

Among apparatus for recording and reproducing video data, the main stream has been the so-called helical scan VCR, in which recording is made by scanning a magnetic head mounted on a rotary drum diagonally with respect to a tape.

Video signals are transmitted in a signal format having a constant periodicity. Therefore, apparatus for recording and reproducing them is equipped with a mechanical recording system that synchronizes with the video signals. To be concrete, 30 frames of images are transmitted each second in the NTSC method, and a VCR that records them rotates a rotary drum 30 times a second, so as to record the image of one frame at every rotation. Or, the VCR is adapted for the segment recording method, in which each frame is recorded by dividing it with a rotational speed of an integral multiple (150 revolutions for instance). The former is a recording method used mainly for analog VCR's, and the latter is a recording method mainly used for digital-video VCR's.

With regard to a recording tape pattern, the recording is made in such a track pitch that reduces amount of tape usage taking into consideration a mechanical accuracy, an error due to deformation of a tape, and so on.

It is generally taken as a guide that a width of recording tracks is twice the width of a minimum track, from which recorded signals can be reproduced, in order to realize compatibility of reproduction.

Described hereinafter, as an example, is a conventional VCR for broadcasting use abiding by the D-7 format of the SMPTE (i.e. Society of Motion Picture and Television Engineers) standard, with a tape of 6.35 mm width.

The conventional VCR for broadcasting use forwards a tape of 6.35 mm width at a speed of 33.8 mm/sec. It performs the so-called one-channel recording with a pair of heads mounted on a rotary drum of 21.7 mm in diameter, which rotates at 9,000 rpm (revolutions per minute). It records one frame of NTSC video data by dividing it into ten tracks (i.e. segment recording).

A track pitch for each of the tracks is 18 µm. This is a so-called guard-bandless recording method in the azimuth recording, and a width of the tracks is same as the track pitch.

Information to be recorded are video data compressed into approximately 25 Mbps and audio data of approx. 1.5 Mbps. A total recording rate is 41.85 Mbps after an ECC (error correction code), a SYNC (synchronous) data, an ID data, and the like are added to the video data and the audio data.

Although the track width virtually needed for recording and reproduction is approx. 9 µm in this instance, the track pitch is normally set for 18 µm, in consideration of reproduction compatibility, envelope variation, output reduction and dispersion of performance due to an environmental change, and editing of images. As a result, it is possible to reproduce the tracks of 9 µm width in the worst case even if interchanged reproduction and interchanged editing are made with a different VCR.

There are also occasions that HD signals of higher image quality than the NTSC signals are recorded using a basic mechanism of the conventional VCR for broadcasting use. In such cases, the HD signals of one frame is compressed into 100 Mbps, and recorded in four recording tracks (four-channel recording) at every half turn of the rotary drum comprising two combinations of four recording heads. Tape speed is 135.2 mm/sec.

In this instance, one frame of the compressed video data is recorded by dividing it into 40 tracks. A track pitch for each of the tracks is 18 µm. Compatibility of reproduction with other apparatus can be ensured under all circumstances when recording is made with the track pitch of 18 µm.

Although the apparatus can be adapted for the higher image quality by employing the recording head for four channels ("ch"), a recording time decreases to one-fourth, as it uses quadruple the tape needed for the 1-ch recording. In other words, a cost of the tape goes up.

It is therefore desired that use of tape be reduced by narrowing the track pitch (narrowed track), so as to realize a long-hour recording, and reduction of the tape cost.

However, there occurs a slim-out of the tracks and incomplete erasing, when a cut editing and a link editing are made on the tape with a VCR adapted for the narrowed track (a track pitch of 9 µm, for instance) in the conventional format. Consequently, a problem results in that the VCR is unable to reproduce the tracks around the edited spot. There is also a probability of erasing a track preceeding the editing IN spot, or failing to erase a track being edited right after the IN spot, when, for instance, a cut editing is being made.

SUMMARY OF THE INVENTION

The present invention was derived in consideration of the foregoing problem.

A magnetic recording and reproducing apparatus of the present invention is a helical scan type magnetic recording and reproducing apparatus for recording data of vide signal on a sync-block by sync-block basis in an N number (N≧3, and N represents a natural number) of tracks in one frame period on a magnetic tape with a rotary magnetic head, and the apparatus comprises:

a rotary drum unit for driving the rotary magnetic head;

a tape driving unit for driving the magnetic tape;

an encoding section for executing a data compression process on video data on per-frame basis, and outputting a plurality of the compressed video data;

an ECC adding section for adding an error correction code to each of the plurality of compressed video data;

a sync block generating section for producing a plurality of first sync block data in which a synchronizing code and an identification code are added to each of the plurality of compressed video data;

an auxiliary data generating section for producing an auxiliary data;

a recording processor for executing a process of digital recording the plurality of first sync block data and the auxiliary data on the magnetic tape; and a controller for controlling an input of the plurality of first sync block data and the auxiliary data into the recording processor.

The tape driving unit drives the magnetic tape at a first speed. The controller controls in such a manner that the auxiliary data is recorded in two tracks at both ends of the N number of tracks, and the plurality of first sync block data are recorded in the tracks other than the two tracks at both ends of the N number of tracks. Accordingly, the apparatus records the video signal on the magnetic tape in a track pitch that is narrower than the standard track pitch.

Further, the magnetic recording and reproducing apparatus of the present invention is adapted to use a correction code of larger length when recording in the narrow track pitch than that of the standard track pitch.

BRIEF DESCRIPTION OF THE DRAWINGS

FIGS. 1A and 1B are block diagrams of a magnetic recording and reproducing apparatus of an exemplary embodiment of the present invention;

DESCRIPTION OF THE PREFERED EMBODIMENTS

Exemplary embodiments of the present invention will be described hereinafter with reference to the accompanying figures.

(First Exemplary Embodiment)

Figure 1B:
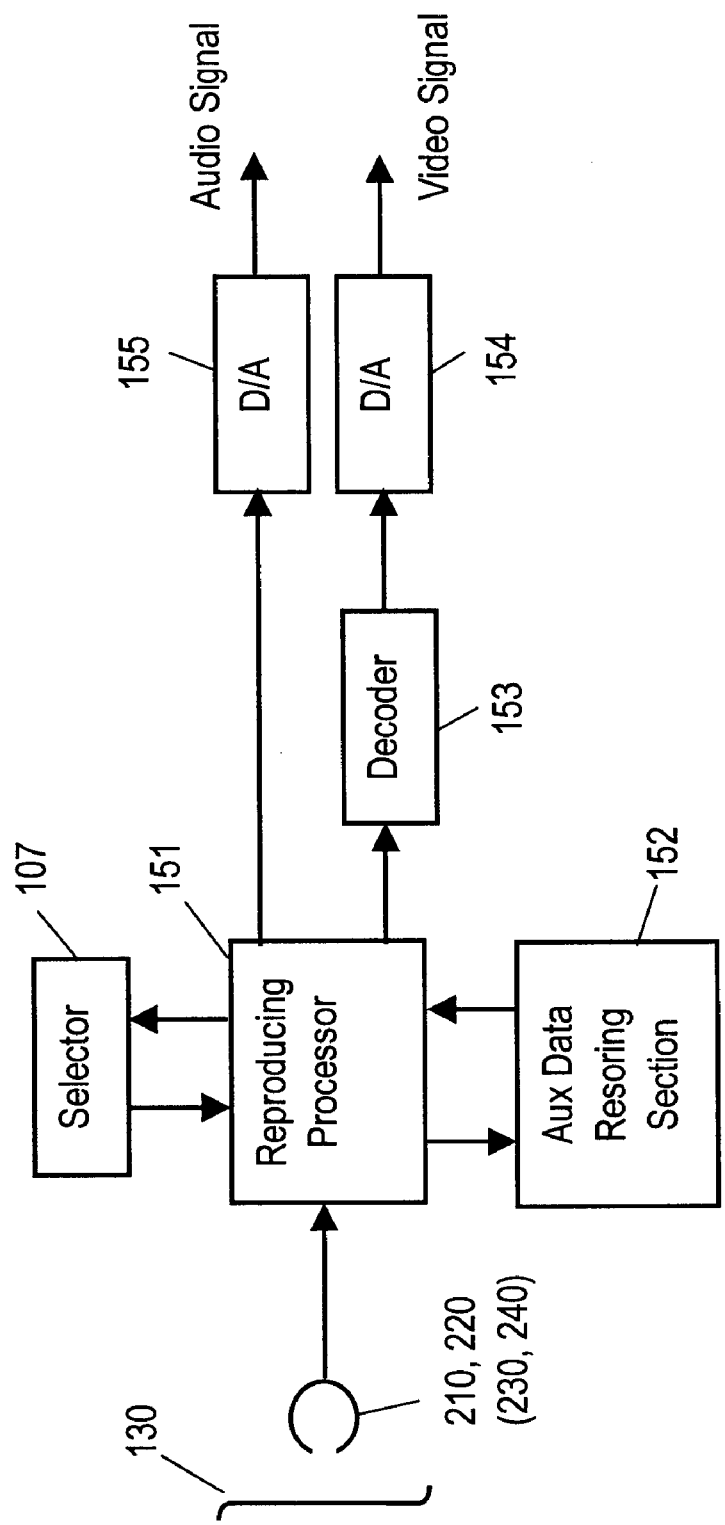
Figure 2:
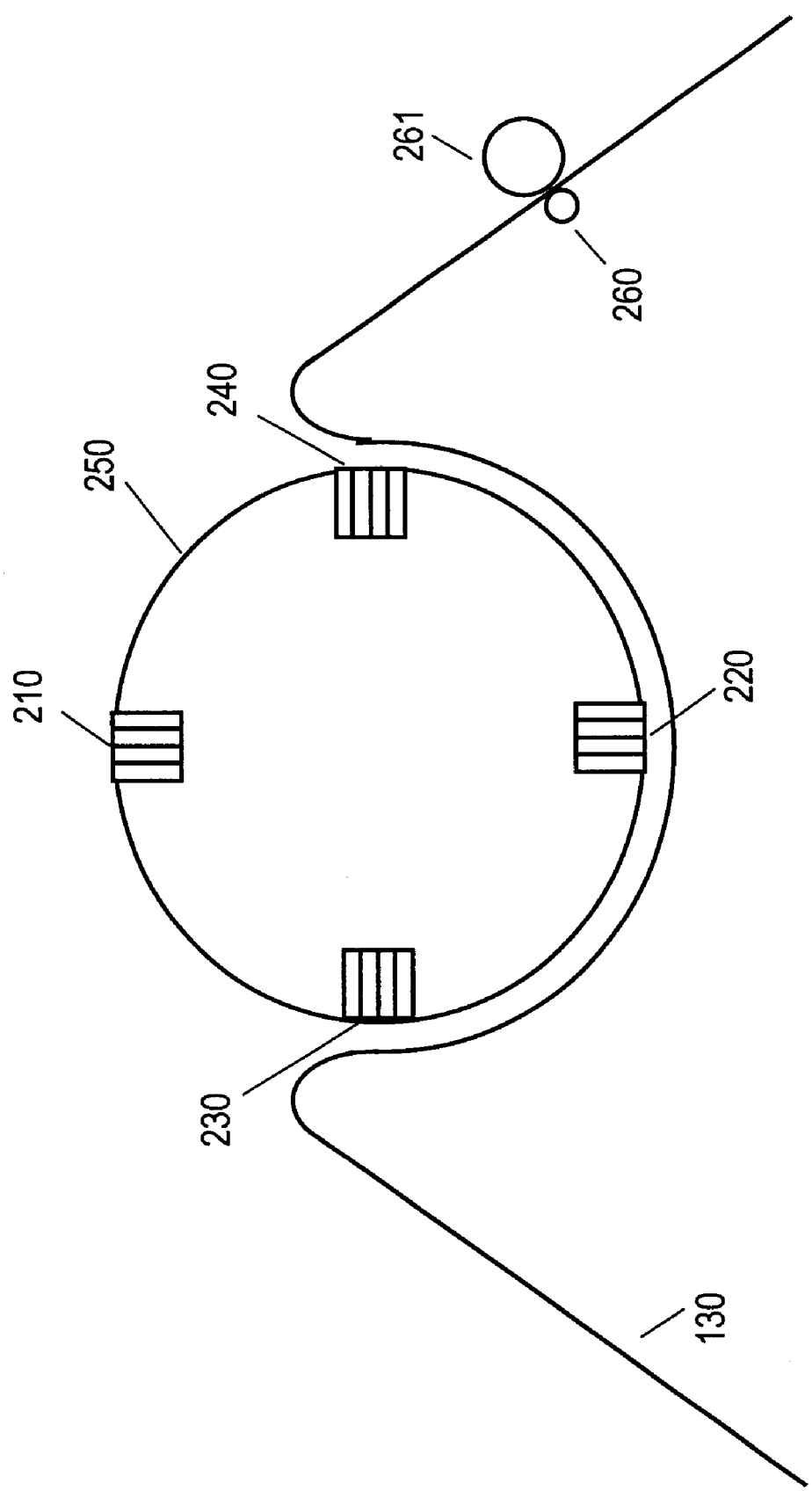
FIG. 2 is a general view depicting a rotary drum and a tape drive system of the magnetic recording and reproducing apparatus of the exemplary embodiment of the present invention.

FIGS. 1A and 1B are block diagrams of a VCR representing a recording and reproducing apparatus of the present exemplary embodiment. FIG. 2 is a general view of a rotary drum and a tape drive system of this exemplary embodiment.

In FIGS. 2A and 2B, a magnetic tape 130 is depressed against a capstan 260 by a pinch roller 261. The capstan 260 is driven by a capstan motor (not shown in the figure), and forwards the magnetic tape 130 at a predetermined speed. Magnetic heads 210 and 220 for four-channel recording corresponding to the standard track format, and magnetic heads 230 and 240 for four-channel recording corresponding to a narrow track format are disposed on a rotary drum 250.

The magnetic heads 210 and 220 form four tracks having a track pitch (TP) of 18 μm each time the rotary drum 250 makes a half turn when recording data in the standard track format. The magnetic heads 230 and 240 form four tracks having a track pitch (TP) of 9 μm each time the rotary drum 250 makes a half turn when recording data in the narrow track format.

The rotary drum 250 rotates at a speed of 9,000 rpm (revolutions per minute). A speed of the magnetic tape 130 is 135.2 mm per second in the case of standard track format, and 67.6 mm per second for the narrow track format. A setting for the standard track format or the narrow track format is made with a selector 107, when recording. In each of the formats, 40 tracks (N=40) are formed during a period of one frame for video signal having a frame frequency of 30 Hz.

Here, width of the magnetic tape 130 is 6.35 mm, and diameter of the rotary drum 250 is 21.7 mm.

Referring now to FIG. 1A, a process carried out during recording will be described hereafter.

An A/D converter 101 converts High Definition (HD) video signal of 30 Hz in frame frequency and 1,125 lines in number of horizontal scanning line into digital signal.

An encoding section 103 divides the video data input by the A/D converter 101 into 5,400 macro-blocks per each frame, and compresses them into approximately 100 Mbps by high efficiency encoding such as the discrete cosine transform and the Huffman code. The compressed 5,400 blocks of video data are output to an error correction code (ECC) adding section 106 and an auxiliary data generating section 105. A data length of each of the compressed video data is 77 bytes.

A selection between the standard track format and the narrow track format is made with a manual switch (not shown in the figure) comprised of the selector 107. The selector 107 sets the format selected by the manual switch, and outputs an information of the set format to a controller 109 and the error correction code (ECC) adding section 106.

Described first is a case in which the selector 107 is sets for a selection of the standard track format.

The error correction code adding section 106 divides the 5,400 compressed video data for each frame into 40 groups. It then adds three VAUX (video auxiliary) data to 135 sets (i.e. 5,400/40) of the compressed video data. In this instance, a data length of the VAUX (video auxiliary) data is 77 bytes. These 138 sets of video data compose a correction code block.

Next, the error correction code adding section 106 adds 11 outer correction codes (C2) to every correction code block. A data length of the outer correction codes (C2) is 77 bytes.

Further, the error correction code adding section 106 adds an inner correction code (C1) of 8 bytes to each of the compressed video data, the VAUX data and the C2, and outputs them to a sync-ID adding section 108.

The Sync-ID adding section 108 adds a sync code of 2 bytes and an ID data of 3 bytes to each of the compressed video data, the VAUX data, and the C2, to which the C1 is added, to compose sync blocks (SB).

Figure 4A:
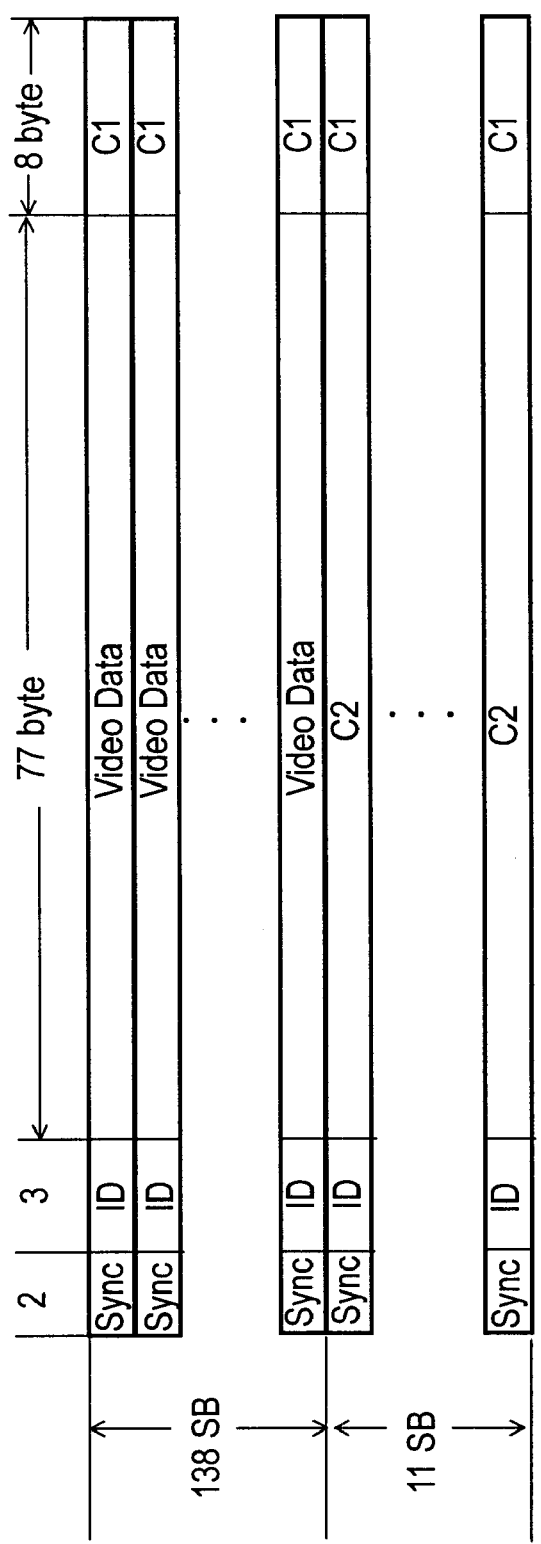
FIGS. 4A and 4B are diagrammatic views illustrating configurations of sync blocks in the first exemplary embodiment of the present invention.

The correction code block processed as described above comprises 149 sync blocks (SB) as shown in FIG. 4A. As shown in the figure, each sync block of the compressed video data has a sync code of 2 bytes as a header of the block, an ID data of 3 bytes representing a location of the data, a compressed video data of 77 bytes, and an inner correction code of 8 bytes, arranged in this order. Its data length is 90 bytes. Each sync block of the outer correction code has an outer code in place of a compressed video data in the sync block of the compressed video data.

The controller 109 controls an output of the sync-ID adding section 108 in a manner that the 149 SB's shown in FIG. 4A are recorded in video sectors within one track. That is, 135 compressed video data are recorded in each track.

An A/D converter 102 converts audio signal into digital audio data. Sync blocks are then composed with an error correction code, a sync code and an ID code added to the audio data on a unit basis of a predetermined data. Thereafter, the sync-ID adding section 108 time-division multiplexes them with the video sync blocks, and outputs them in a manner that they are recorded in audio sectors in each track.

A recording processor 110 modulates four-channel outputs of the sync-ID adding section 108 individually so as to record them on the magnetic tape with the magnetic heads 210 and 220.

In the present exemplary embodiment, the number of sync blocks for the outer correction code is a value determined with consideration given to correctability, redundancy, wave length, circuit scale, and so on.

Figure 3A:
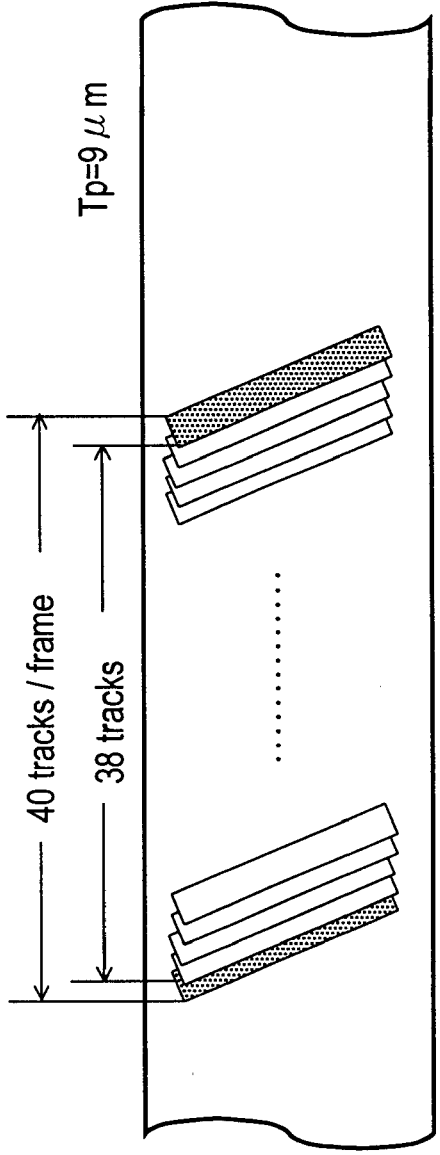
FIGS. 3A and 3B are diagrammatic views depicting tape formats in a first exemplary embodiment of the present invention.
Figure 3B:
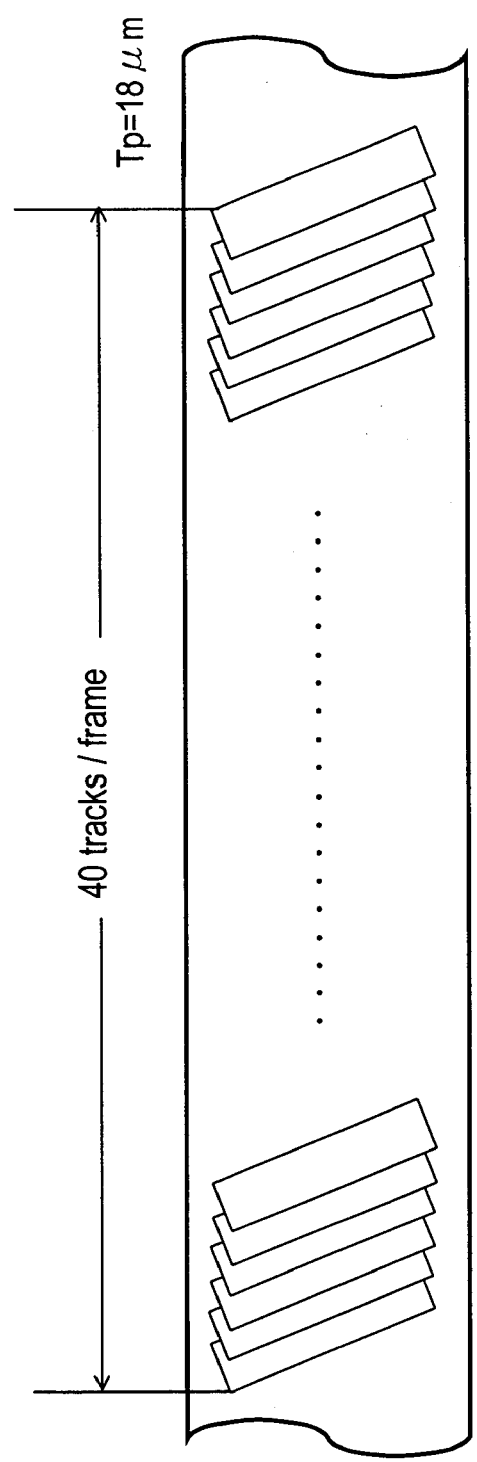

As a consequence of the foregoing, one frame of the video data is recorded in 40 tracks, as shown in FIG. 3B.

Described next is a case in which the narrow track format is selected with the selector 107.

The ECC adding section 106 and the sync-ID adding section 108 perform the same processes to compose sync blocks shown in FIG. 4A, as in the case the standard track format is selected, and details will therefore be omitted.

For the narrow track format, recording is also made on a sync block by sync-block basis. FIG. 4A shows a configuration of the sync blocks. In this case, 40 groups of 149 sync blocks, or 5,960 sync blocks in total, are recorded in 38 tracks in the center as shown in FIG. 3A.

Since the number of sync blocks is indivisible by 38, the ECC adding section 106 and the sync-ID adding section 108 generate pseudo sync blocks, so as to record an equal number of sync blocks in each track. In this instance, the number of sync blocks to be recorded in one track is 157, which is a value derived by raising to unit fractions of 156.84 (i.e. 5,960 divided by 38). In other words, 6 pseudo sync blocks (i.e. 157×38−149×40) are generated.

The auxiliary data generating section 105 draws out low-frequency components from the compressed video data, generates 447 auxiliary data of 17 bytes in data length, and outputs them to the ECC adding section 106. The ECC adding section 106 adds an inner correction code (C1) to each of the auxiliary data, and outputs them to the sync-ID adding section 108. The sync-ID adding section 108 adds a sync code of 2 bytes as a header and an ID data of 3 bytes representing a location of the data to each of the auxiliary data, to which the C1 is added, to generate 447 sync blocks.

Figure 4B:

FIG. 4B shows a configuration of the sync blocks for auxiliary data composed as above.

A length of the sync blocks for the auxiliary data (30 bytes) is one-third of the length of the sync blocks for the compressed video data (90 bytes), as shown in the figure. The 447 auxiliary data sync blocks shown in FIG. 4B are recorded in one track.

The controller 109 controls an output of the sync-ID adding section 108 in a manner that the 447 auxiliary data sync blocks shown in FIG. 4B are recorded in each of the first track and the last track of a frame, and 5,966 sync blocks, including the 6 pseudo sync blocks are recorded equally in the remaining 38 tracks, as shown in FIG. 3A.

The recording processor 110 modulates four-channel output signals of the sync-ID adding section 108, so as to record them on the magnetic tape 130 with the magnetic heads 230 and 240.

As stated above, this invention is to record the auxiliary data as search data that can be reproduced even in such a high-speed reproduction that the data in the center tracks are not reproducible. Since the search data are drawn out from the compressed video data, no data needs to be newly generated when searching.

It is desirable to set the sync block length of the auxiliary data to one-half or less of the sync block length of the compressed video data. This positively increases a pick-up rate of the data during the high-speed reproduction, so as to nearly double a search speed. In the present exemplary embodiment, a high-speed search of even faster speed is made possible because the sync block length of the auxiliary data is set to one-third of the sync block length of the compressed video data.

A process during reproduction will be described hereinafter with reference to FIG. 1B.

At the beginning of reproduction, the selector 107 selects either of the standard track format and the narrow track format. The magnetic heads corresponding to the selected format reproduce date, and acquire format information contained in the reproduced data. Any of the standard track format and the narrow track format is set based on the acquired format information, and the format information set here is output to a reproducing processor 151.

The magnetic heads 210/220 or 230/240 reproduce signals according to the set format information. The reproduced signals are demodulated in the reproducing processor 151. Audio signals in the demodulated signals are converted into analog audio signals by a D/A converter, after they are processed for error correction and the like.

Reproduction processes for the video data and auxiliary data will be described below.

A reproduction process for the video data recorded in the standard track format will be described first.

The reproduced and demodulated video data are processed by the reproducing processor 151 for inner code correction, outer code correction, etc. for every 40 tracks, and output to a decoder 153. The decoder 153 decodes the compressed video data by carrying out an inverted process of the encoding section 103, and outputs them to a D/A converter 154.

Next, a reproduction process for the video data recorded in the narrow track format is described. The reproducing processor 151 time-base decompresses (40/38 times) the compressed video data reproduced from the 38 tracks, excluding 2 at both ends of the 40 tracks per frame, as shown in FIG. 3A, and outputs them to the decoder 153 after processing for inner code correction, outer code correction, and the like. The decoder 153 decodes the compressed video data by carrying out an inverted process of the encoding section 103, and outputs them to the D/A converter 154. The auxiliary data reproduced from the 2 tracks at both ends of the 40 tracks/frame, shown in FIG. 3A, are processed by the reproducing processor 151 for inner code correction, etc. and output to an auxiliary data restoring section 152. The auxiliary data restoring section 152 restores the auxiliary data. During a high-speed search, the decoder 153 decodes the restored auxiliary data, and outputs them to the D/A converter 154.

In the present exemplary embodiment, the low-frequency components drawn out as the auxiliary data from the compressed video data are used as search data. Since the low-frequency components are drawn out from the compressed video data, no data needs to be newly generated when searching.

Figure 5:
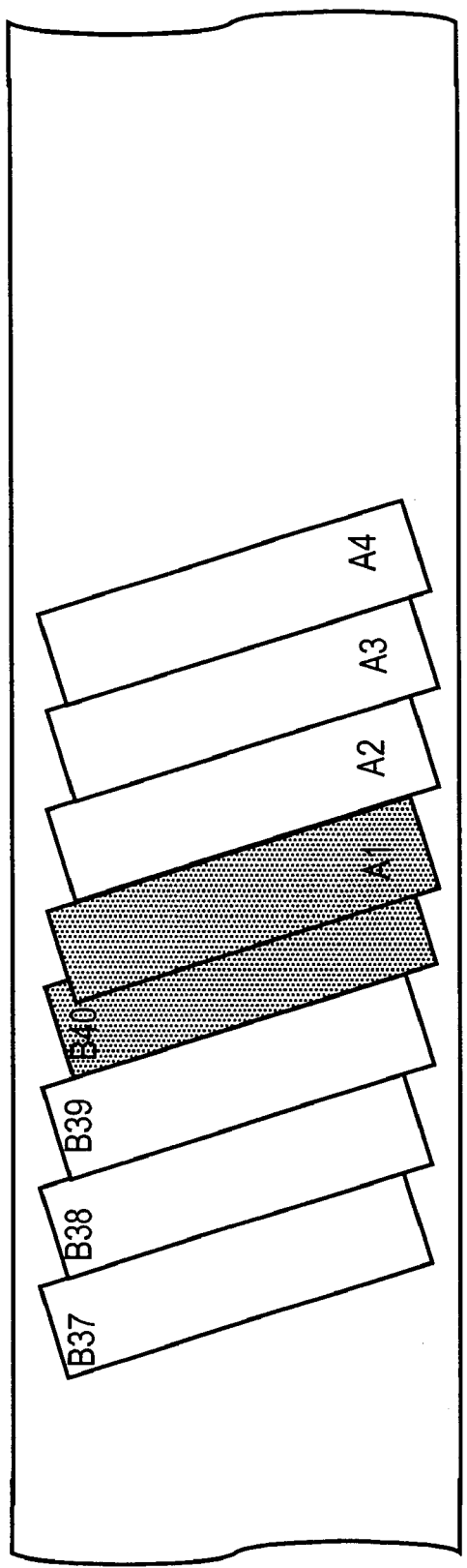
FIG. 5 is a diagrammatic view illustrating a track pattern around an editing spot associated with the present invention.

FIG. 5 shows a track pattern after a tape recorded in the narrow track format is edited by linking it to an end of a scene recorded continuously with another VCR, which is different from the one used for the recording. In this instance, there may be a case in which a last track B40 of the preceeding frame is overwritten by a first track A1 of the linked frame, as shown in FIG. 5, due to a difference in system accuracy of the apparatus, etc. This decreases a reproduced signal level of the track B40, and makes the signal not reproducible. In addition, there may be a case wherein a truck of the same azimuth as the track A1 is left unerased between the tracks B40 and A1, although not shown in the figure. This lowers an S/N ratio because a signal in the unerased track is also reproduced when the track A1 is being reproduced, and thereby a signal in the track A1 may become unreproducible.

However, there is no impediment to reproduction of the essential video data, since the signals recorded in the tracks B40 and A1 are the auxiliary data in this embodiment.

The auxiliary data is used to read an outline of data when searching, and it does not require an addition of outer parity for each track. Further, the auxiliary data recorded here may be an outline of the video data, or it can be of any data belonging to the video data. Furthermore, there is not any problem even if the auxiliary data is read during an ordinary reproduction.

In addition, it is possible to record the auxiliary data in the two side tracks during the normal play, but to record a single frequency not interfering with recording and reproducing, or an erasing signal by an erase head in the first track at a start of the recording or the last track at an end of the recording when editing. This can avoid interference resulting from a track of the same azimuth due to an overlapping of the tracks in the editing spot.

Further, although numbers of sync blocks for the compressed video data, the outer code, and the auxiliary data have been given respectively as 138, 11, and 447, in the foregoing description, they are not restrictive. The sync blocks for the outer code can be of any number suitable for the purpose, taking into consideration correctability, redundancy, wavelength, circuit scale, and so on.

Furthermore, constituent elements in the sync blocks and data length of each of the constituent elements are not limited to those values described in this exemplary embodiment.

Moreover, although the sync blocks of the compressed video data also contain 3 sync blocks of the VAUX data, the VAUX data need not necessarily be included. A significance of including the VAUX data is that an important auxiliary data representing features and the like of the VCR can be stored within a portion of the compressed video data.

Also, methods of selecting and setting a format with the selector 107 when recording or reproducing are not limited to those methods described in this exemplary embodiment.

(Second Exemplary Embodiment)

A general structure of a rotary drum and a tape drive system in a second exemplary embodiment is identical to what is shown in FIG. 2. In an example of this exemplary embodiment, the magnetic heads 210 and 220 corresponding to the standard track format, and the magnetic head 230 and 240 corresponding to the narrow track format are adapted for one-channel recording.

Figure 6A:
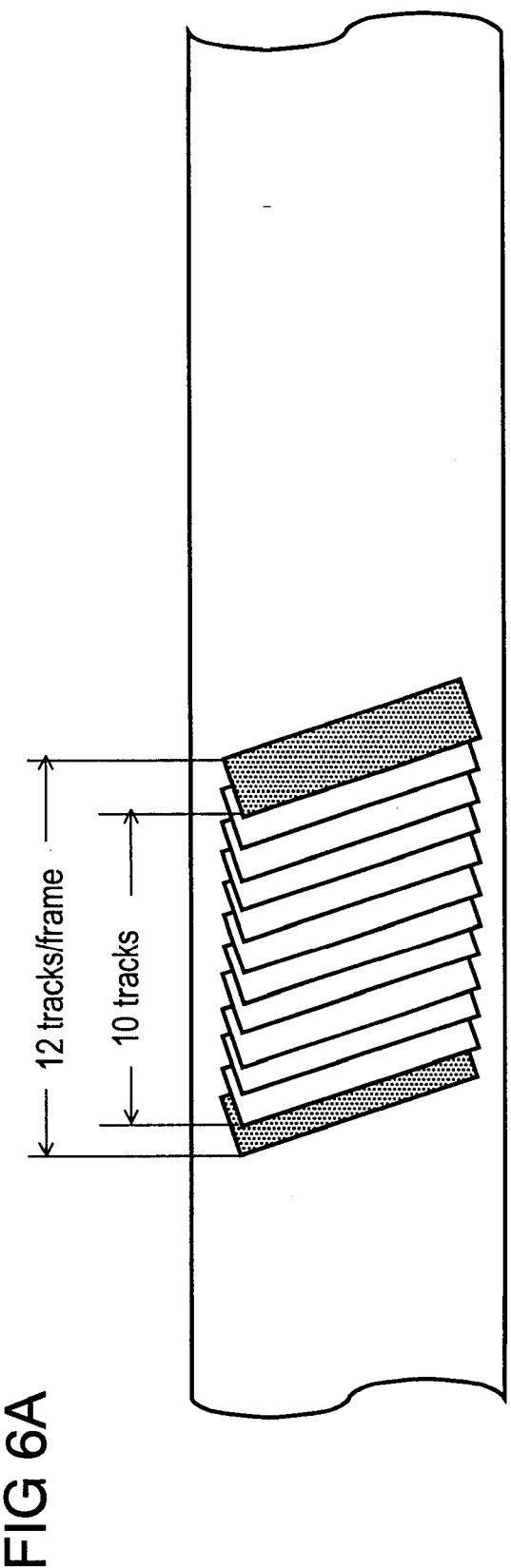
FIGS. 6A and 6B are diagrammatic views depicting tape formats in a second exemplary embodiment of the present invention.
Figure 6B:
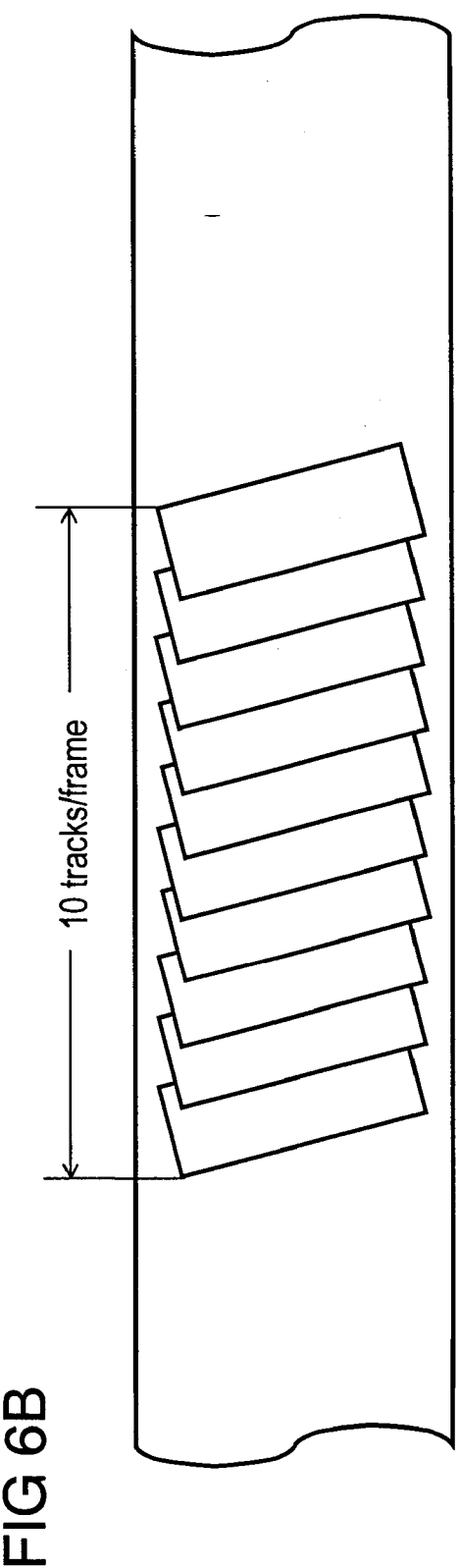

A capstan motor drives a magnetic tape 130 at a speed of 33.8 mm/sec for the standard track format. As a result, there can be formed ten tracks (N=10) having a track pitch (TP) of 18 $\mu$m during a period of one frame for a video signal of 30 Hz in frame frequency, as shown in FIG. 6B.

In the case of narrow track format, the capstan motor drives the magnetic tape 130 at a speed of 20.28 mm/sec. A rotary drum 250 is thus driven at a speed of 10,800 rpm. Consequently, there can be formed twelve track (N=12) having a track pitch (TP) of 9 $\mu$m during a period of one frame for the video signal of 30 Hz in frame frequency, as shown in FIG. 6A.

A block structure of a recording and reproducing apparatus of this exemplary embodiment is same as that shown in FIG. 1A and FIG. 1B.

In this exemplary embodiment, Standard Definition (SD) video signal of 30 Hz in frame frequency and 525 lines in number of horizontal scanning line is input to an A/D converter 101.

An encoding section 103 divides the video data input from the A/D converter 101 into 1,350 macro-blocks per each frame, and compresses them into approximately 25 Mbps by high efficiency encoding such as the discrete cosine transform and the Huffman code. The 1,350 compressed video data are output to an error correction code (ECC) adding section 106 and an auxiliary data generating section 105. A data length of each of the compressed video data is 77 bytes.

Described first is a case in which a selector 107 is sets for a selection of the standard track format.

The error correction code adding section 106 divides the 1,350 compressed video data for each frame into 10 groups. In this instance, a video block for correction code is composed of 135 (i.e. 1,350 divided by 10) sets of the compressed video data and 3 sets of VAUX data.

Other processes to compose sync blocks in a unit basis of video block for correction code, shown in FIG. 4A, are same as those of the first exemplary embodiment, and their details will be skipped.

A controller 109 controls an output of a sync-ID adding section 108 in a manner that data of the video blocks for correction code are recorded into video sectors in one track. Accordingly, 135 compressed video data are recorded in each track.

A recording processor 110 modulates an output of the sync-ID adding section 108 so as to record it on the magnetic tape with the magnetic heads 210 and 220.

Described next is a case in which the narrow track format is selected with the selector 107.

The ECC adding section 106 and the sync-ID adding section 108 perform the same processes to compose the sync blocks shown in FIG. 4A, as in the case the standard track format is selected, and details will therefore be omitted.

For the narrow track format, recording is also made on a sync block by sync-block basis. A configuration of the sync blocks is shown in FIG. 4A. In this case, 10 groups of 149 sync blocks, or 1,490 sync blocks in total, are recorded in 10 tracks in the center as shown in FIG. 6A.

An auxiliary data generating section 105 carries out the same process as described in the first exemplary embodiment, to generate 447 sync blocks, as shown in FIG. 4B.

The controller 109 records the 447 auxiliary data sync blocks shown in FIG. 4B in each of the first track and the last track of a frame, as shown in FIG. 6B. The controller 109 then controls an output of the sync-ID adding section 108 in a manner that the 1,490 sync blocks are recorded equally in the remaining 10 tracks. In this exemplary embodiment, the 1,490 sync blocks are output after they are compressed by 10/12 in the time base in order to record them into the 10 tracks.

The recording processor 110 performs a process of modulating one-channel output signals of the sync-ID adding section 108, so as to record them on the magnetic tape 130 with the magnetic heads 230 and 240.

A reproducing processor 151, on the other hand, reproduces the compressed video data track by track from the 10 tracks by performing the same process as the first exemplary embodiment, when a selection is made for the standard track format with the selector 107. When the narrow track format is selected, the reproducing processor 151 reproduces the compressed video data track by track from the ten tracks in the center of the 12 tracks by performing the same process as the first exemplary embodiment. The auxiliary data in the 2 tracks at both ends are recovered by an auxiliary data restoring section 152.

According to the present exemplary embodiment, as described, a recorded wavelength of the compressed video data in the narrow track format becomes equal to that of the standard track format. Therefore, this embodiment realizes a long-time recording without causing a characteristic degradation in the magnetic recording and reproduction.

(Third Exemplary Embodiment)

Figure 7A:
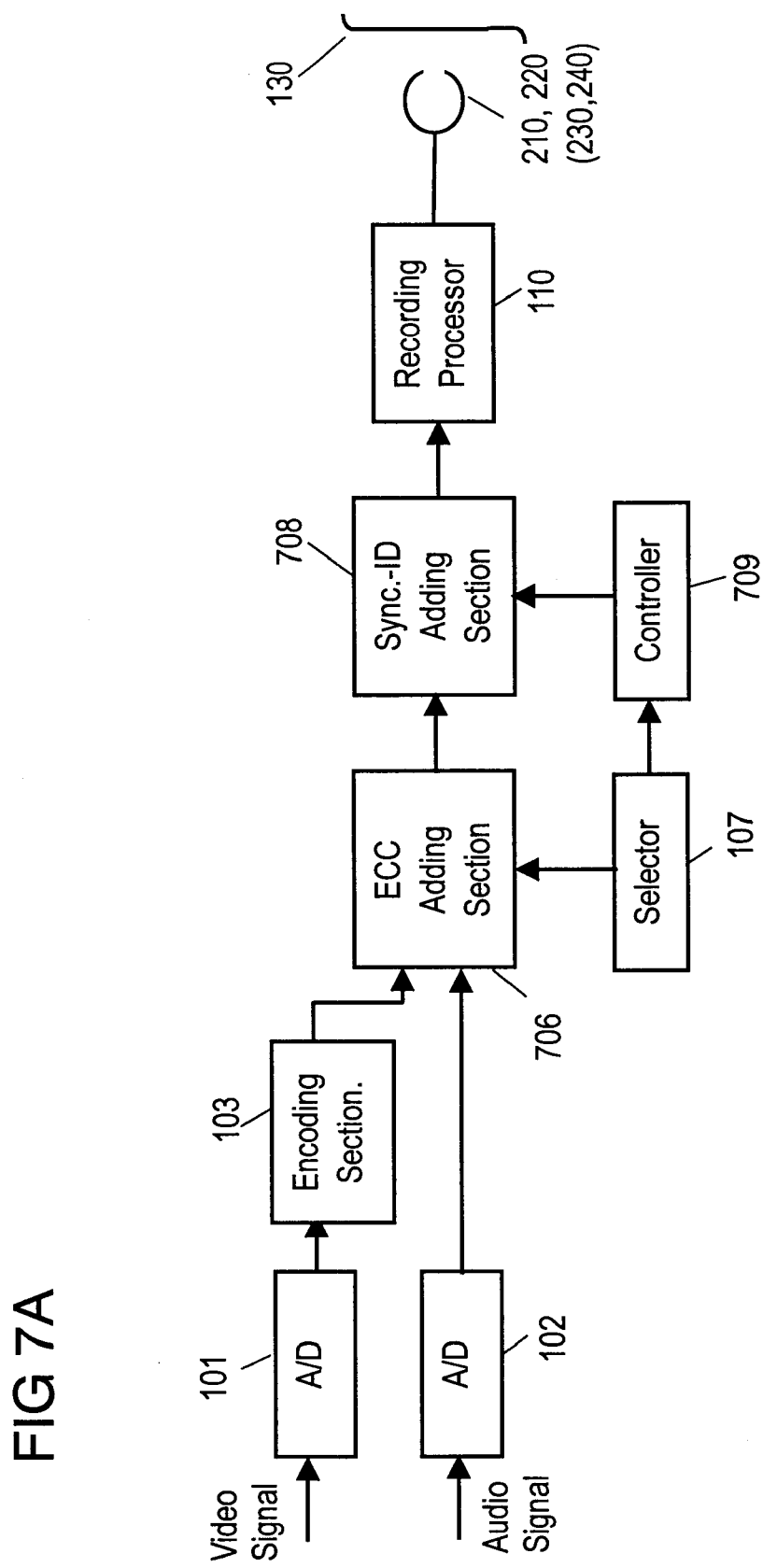
FIGS. 7A and 7B are block diagrams of a magnetic recording and reproducing apparatus of a third exemplary embodiment of the present invention.
Figure 7B:
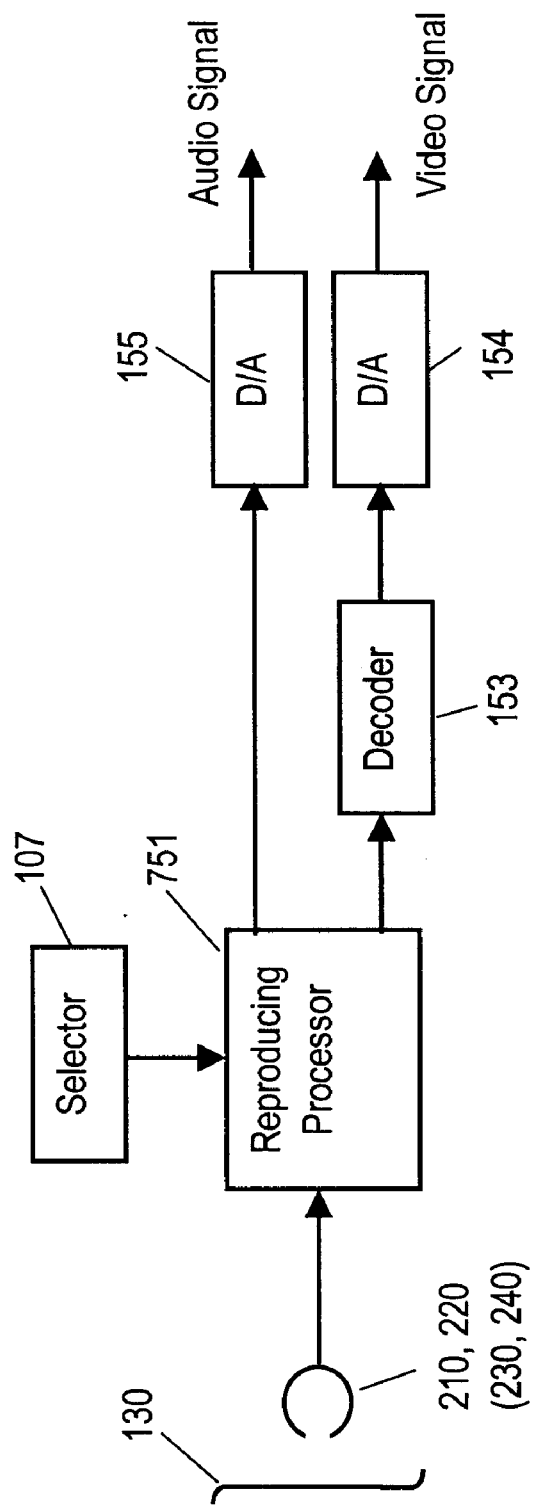

FIGS. 7A and 7B show block structures of a recording and reproducing apparatus of the present exemplary embodiment. In FIGS. 7A and 7B, like reference numerals are used throughout to represent the same components as those of FIGS. 1A and 1B.

A general structure of a rotary drum and a tape drive system in this exemplary embodiment is identical to what is shown in FIG. 2. Structures of magnetic heads 210 and 220 corresponding to the standard track format and magnetic heads 230 and 240 corresponding to the narrow track format, a rotational speed of a rotary drum 250, and a speed of a tape 130 are also same as those of the first exemplary embodiment.

Referring now to FIGS. 7A, 7B, 8A and 8B, the present exemplary embodiment will be described hereinbelow.

A/D converters 101 and 102 are fed respectively with same HD video signal and audio signal as the first exemplary embodiment. As the audio signal is processed in the same manner as the first exemplary embodiment, its detail will be skipped.

The video signal, after A/D conversion, is compression-processed by an encoding section 103 in the same manner as the first exemplary embodiment, and resultant 135 compressed video data are output to an ECC adding section 706.

Figure 8A:
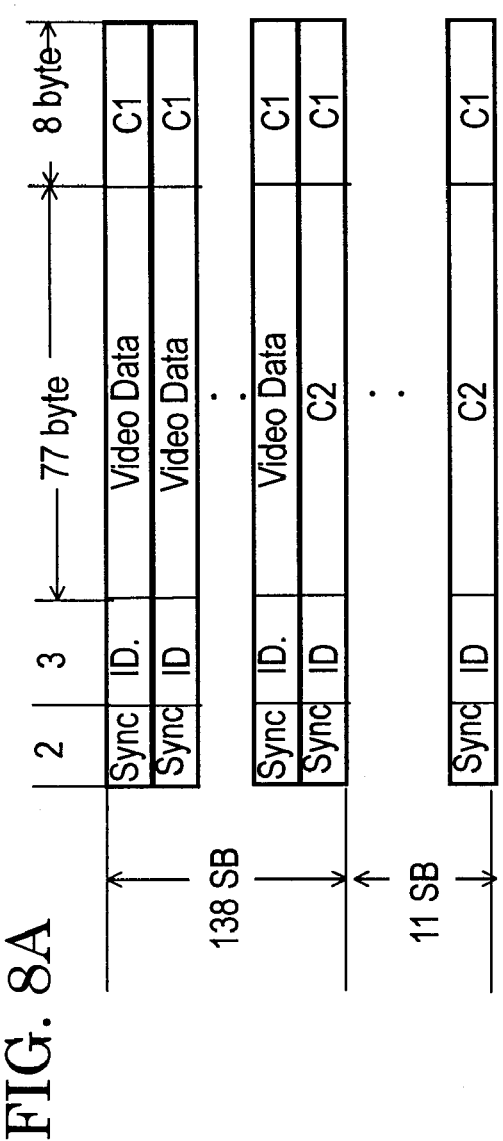
FIGS. 8A and 8B are diagrammatic views illustrating configurations of sync blocks in the third exemplary embodiment of the present invention.

First, when a selector 107 is set for selection of the standard track format, the ECC adding section 706 and a sync-ID adding section 708 perform the same processes as the ECC adding section 106 and the sync-ID adding section 108 in the first exemplary embodiment, and generate sync blocks shown in FIG. 8A.

A controller 709 controls an output of the sync-ID adding section 708 in a manner that the 149 SB's shown in FIG. 8A are recorded in video sectors within one track. As a result, the compressed video signals for one frame are recorded in 40 tracks in the same manner as in the case of the first exemplary embodiment. A reproduction process is also performed in the same way as the first exemplary embodiment, and details will be omitted.

Described next is a case in which the narrow track format is selected with the selector 107.

The ECC adding section 706 produces 2,700 compressed video data consisting of 2 compressed macro blocks. In this case, a length of the compressed video data is 154 bytes. Then, the ECC adding section 706 produces a correction code block by dividing the 2,700 compressed video data into 20 groups, and adding VAUX data thereto. The correction code block is comprised of 135 compressed video data and 3 VAUX data.

The ECC adding section 706 adds 12 outer correction codes (C2) to each correction code block. A data length of the outer correction code (C2) is 154 bytes.

The ECC adding section 706 further adds an inner correction code (C1) of 16 bytes to the compressed video data, the VAUX data and the C2, and outputs them to the sync-ID adding section 708.

The sync-ID adding section 708 adds a sync code of 2 bytes and an ID data of 3 bytes to each of the compressed video data, the VAUX data and the C2, to which the C1 is added, to compose sync blocks (SB).

Figure 8B:
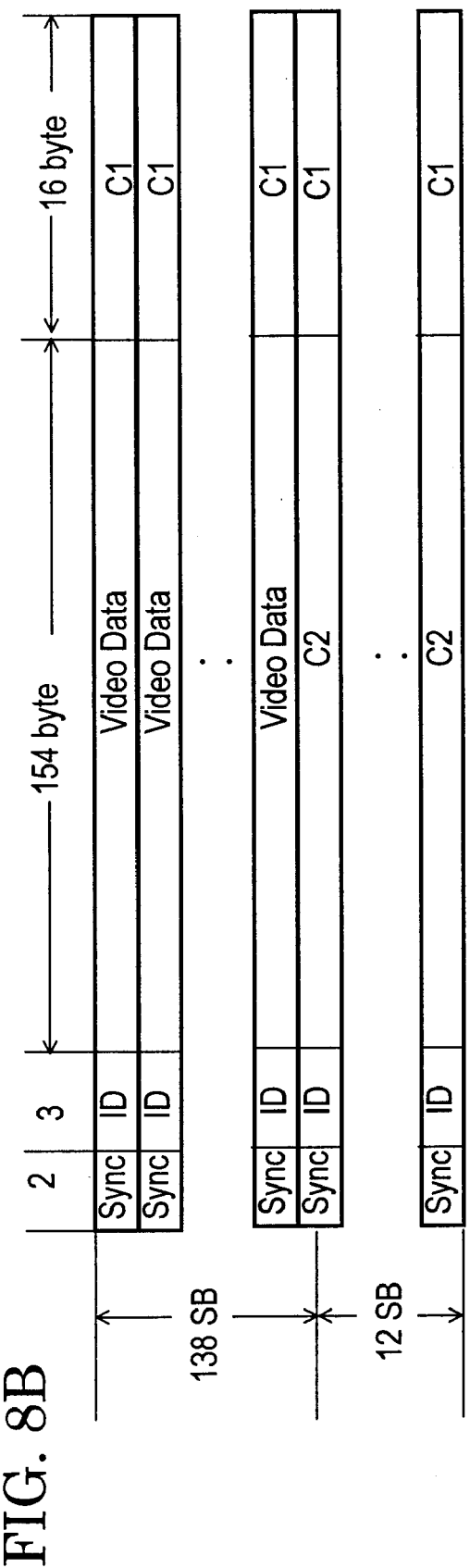

The correction code block processed as described above comprises 150 sync blocks (SB) as shown in FIG. 8B. As shown in this figure, each sync block of the compressed video data has a sync code of 2 bytes as a header of the block, an ID data of 3 bytes representing a location of the data, a compressed video data of 154 bytes, and an inner correction code of 16 bytes, arranged in this order. Its data length is 175 bytes.

The ECC adding section 706 and the sync-ID adding section 708 generate 2 pseudo sync blocks, so as to distribute an equal number of sync blocks into each track in recording the 20 groups of 150 sync blocks, i.e. 3,000 sync blocks in total, into 38 tracks in the center, as shown in FIG. 3A.

A controller 709 controls an output of the sync-ID adding section 708 so as to record the 3,002 sync blocks, including the pseudo sync blocks, equally in the 38 tracks, as shown in FIG. 3A.

It is desirable to record no data of any kind or a single frequency not interfering with recording and reproducing, in the 2 tracks at both ends of the 40 tracks shown in FIG. 3A in order to avoid an adverse effect with respect to each other when editing. Or, an auxiliary data may be recorded in the like manner as the first exemplary embodiment.

A process during reproduction will be described hereinafter with reference to FIG. 7B.

At the beginning of reproduction, the selector 107 is set for a selection of either the standard track format or the narrow track format. Magnetic heads corresponding to the selected format reproduce date, and acquire a format information contained in the reproduced data. Either of the standard track format and the narrow track format is set based on the acquired format information, and the format information set here is output to a reproducing processor 751.

The magnetic heads 210/220 or 230/240 reproduce signals according to the set format information. The reproduced signals are demodulated in the reproducing processor 751. Audio signals in the demodulated signals are converted into analog audio signals by a D/A converter 155, after they are processed for error correction, and so on.

A reproduction process of the video data recorded in the standard track format will be described first.

The reproduced and demodulated video data are processed by the reproducing processor 751 for inner code correction, outer code correction, etc. for each of the 40 tracks, and output to a decoder 153. The decoder 153 decodes the compressed video data by carrying out an inverted process of the encoding section 103, and outputs them to a D/A converter 154.

Next, a reproduction process of the video data recorded in the narrow track format is described. The reproducing processor 751 time-base decompresses (40/38 times) the compressed video data reproduced from the 38 tracks, excluding 2 at both ends of the 40 tracks per each frame, as shown in FIG. 3A, and outputs the data to the decoder 153 after processing for inner code correction, outer code correction, and the like. The decoder 153 decodes the compressed video data by carrying out an inverted process of the encoding section 103, and outputs them to the D/A converter 154.

Figure 9B:
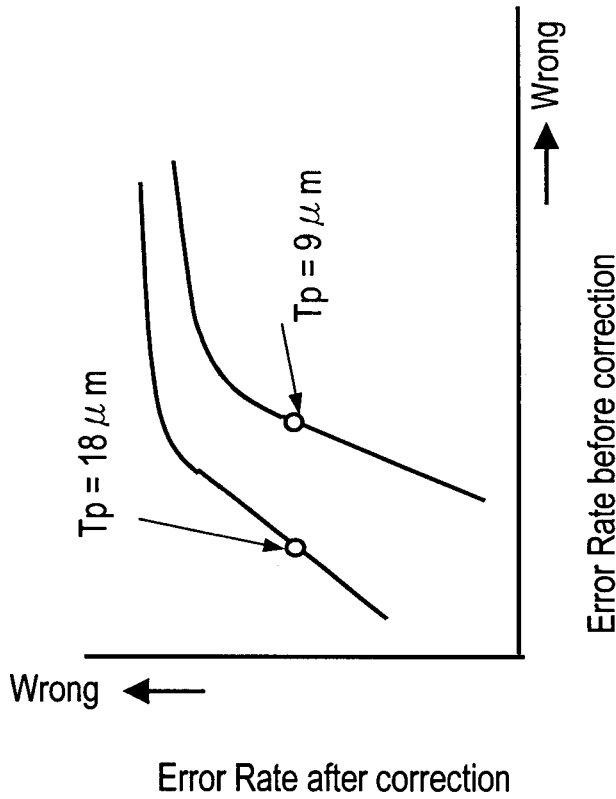
FIGS. 9A and 9B are graphical representations showing a relation between track width and error rate in reproduction and another relation between error rate in reproduction and error rate after correction in the third exemplary embodiment of the present invention.
Figure 9A:
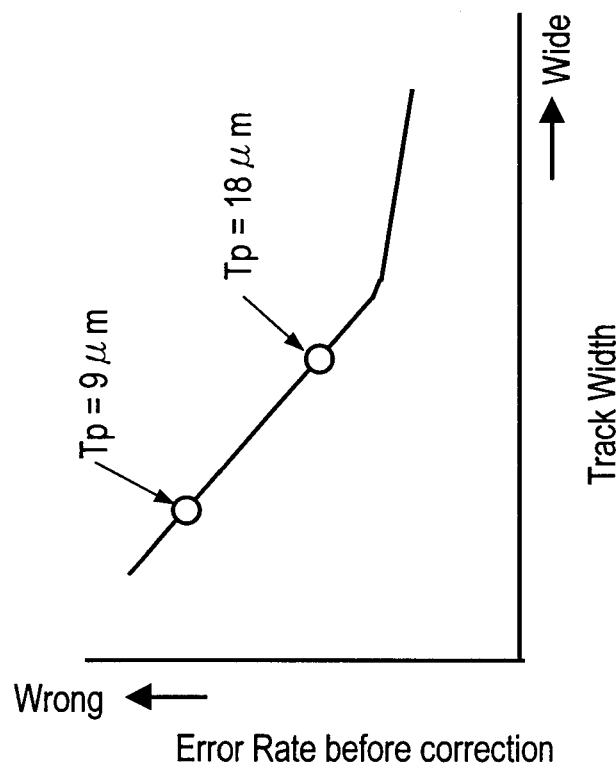

FIG. 9A shows a relation between track pitch (width of the recording and reproducing tracks) and byte-error rate before error correction. This figure shows that an error rate of the wide track-pitch format is smaller, and therefore better, than an error rate of the narrow track-pitch format.

FIG. 9B shows another relation between byte-error rate before the error correction and byte-error rate after the error correction. As shown in this figure, a difference in error rate after the error correction on random error is very small between the two formats. This is attributable to the fact that an error correctability of Reed-Solomon cods (170, 154) is higher than that of Reed-Solomon codes (85, 77).

This exemplary embodiment is to improve the error correctability by increasing the error correction codes in each sync block in the narrow track format. It can also make a recorded wavelength of the narrow track format equal to a recorded wavelength in the standard track format by increasing the compressed video data in each sync block.

Numbers of the sync blocks for the compressed video data and the outer code are not limited to the values described in the present exemplary embodiment. The number of sync blocks for the outer code can be of any value appropriate for the purpose, with consideration given to correctability, redundancy, wavelength, circuit scale, and so on. Likewise, constituent elements in the sync blocks and data length of each of the constituent elements are not limited to those values described in this exemplary embodiment.

Furthermore, data length of the error correction code in the narrow track format is not restrictive to double that of the standard track format. It needs not be limited to double, but can be as large as a triple length. Also, it is not limited to an integral multiple. However, the circuit configuration can be simplified if it the length is integrally multiplied.

Moreover, track pitches for the standard track format and the narrow track format have been described respectively as being 18 μm, and 9 μm, but these are not restrictive, and any figures can be suitable for the track pitches so long as they ensure the reproducibility and editing functionality.

What is claimed is:

1. A magnetic recording and reproducing apparatus of helical scan type for recording data of video signal on a sync-block by sync-block basis in an N number (N≧3, and N representing a natural number) of tracks in one frame period on a magnetic tape with a rotary magnetic head, said apparatus comprising:

a rotary drum unit for driving said rotary magnetic head;

a tape driving unit for driving said magnetic tape;

an encoding section for executing a data compression process on video data on per-frame basis, and outputting a plurality of the compressed video data;

an ECC adding section for adding an error correction code to each said plurality of compressed video data;

a sync block generating section for producing a plurality of first sync block data by adding a synchronizing code and an identification code to each said plurality of compressed video data;

an auxiliary data generating section for producing an auxiliary data;

a recording processor for executing a process of digital recording said plurality of first sync block data and said auxiliary data on said magnetic tape; and a controller for controlling an input of said plurality of first sync block data and said auxiliary data into said recording processor, wherein
      said tape driving unit drives said magnetic tape at a first speed,
      said controller controls in a manner that said auxiliary data is recorded in two tracks at both ends of said N number of tracks, and said plurality of first sync block data are recorded in the tracks other than said two tracks at both ends of said N number of tracks, whereby
      said apparatus records said plurality of first sync block data and said auxiliary data in a first recording format on said magnetic tape.

2. The magnetic recording and reproducing apparatus of helical scanning type according to claim 1, further comprising a selector for setting a selection between said first recording format and a second recording format, wherein
   when said selector is set for said second recording format:
      said tape driving unit drives said magnetic tape at a second tape speed that is faster than said first speed; and
      said controller controls in a manner that said plurality of first sync block data are recorded in said N number of tracks, whereby
      said apparatus records said plurality of first sync block data in said second recording format on said magnetic tape.

3. A magnetic recording and reproducing apparatus of helical scan type for recording data of video signal on a sync-block by sync-block basis in an N number (N≧3, and N representing a natural number) of tracks in one frame period on a magnetic tape with a rotary magnetic head, said apparatus comprising:

a rotary drum unit for driving said rotary magnetic head;

a tape driving unit for driving said magnetic tape;

an encoding section for executing a data compression process on video data on per-frame basis, and outputting a plurality of the compressed video data;

an ECC adding section for adding an error correction code to each said plurality of compressed video data;

a sync block generating section for producing a plurality of first sync block data by adding a synchronizing code and an identification code to each said plurality of compressed video data;

an auxiliary data generating section for producing an auxiliary data;

a recording processor for executing a process of digital recording said plurality of first sync block data and said auxiliary data on said magnetic tape;

a controller for controlling an input of said plurality of first sync block data and said auxiliary data into said recording processor, and a selector for setting a selection between a first recording format and a second recording format, wherein
      when said selector is set for said first recording format:
         said tape driving unit drives said magnetic tape at a first speed;
         said rotary drum unit drives said magnetic head at a first rotational speed; and
         said controller controls in a manner that said plurality of first sync block data are recorded in said N number of tracks, whereby
         said apparatus records said plurality of first sync block data in said first recording format on said magnetic tape, and further wherein
      when said selector is set for said second recording format:
         said tape driving unit drives said magnetic tape at a second speed that is faster than said first speed;

said rotary drum unit drives said magnetic head at a second rotational speed equal to (N+2)/N times said first rotational speed; and said controller controls in a manner that said auxiliary data is recorded in two tracks at both ends of (N+2) number of tracks, and said plurality of first sync block data are recorded in the tracks other than said two tracks at both ends of said (N+2) number of tracks, whereby said apparatus records said plurality of first sync block data and said auxiliary data in said second recording format on said magnetic tape.

4. The magnetic recording and reproducing apparatus of helical scanning type according to any one of claim 1 through claim 3, wherein said auxiliary data represents a signal of single frequency.

5. The magnetic recording and reproducing apparatus of helical scanning type according to any one of claim 1 through claim 3, wherein said auxiliary data represents a search video data for use in search-reproduction.

6. The magnetic recording and reproducing apparatus of helical scanning type according to any one of claim 1 through claim 3, wherein said auxiliary data represents a plurality of search video data generated from said plurality of compressed video data by separating a low-frequency component;

said ECC adding section adds an error correction code to each said plurality of search video data; and said sync block generating section produces a plurality of second sync block data by adding a synchronizing code and an identification code to each said plurality of search video data whereto said error correction code is added.

7. The magnetic recording and reproducing apparatus of helical scanning type according to claim 6, wherein a data length of each said second sync block data is shorter than a data length of each said first sync block data.

8. The magnetic recording and reproducing apparatus of helical scanning type according to claim 6, wherein a data length of each said second sync block data is one half of a data length of each said first sync block data, or shorter.

9. A magnetic recording and reproducing apparatus of helical scan type for recording data of a predetermined period on a sync-block by sync-block basis in an N number (N≧3, and N representing a natural number) of tracks on a magnetic tape with a rotary magnetic head, said apparatus comprising:

a rotary drum unit for driving said rotary magnetic head;

a tape driving unit for driving said magnetic tape;

a recording data generation section for executing a predetermined process on said data of the predetermined period, and producing a plurality of first recording data and a plurality of second recording data;

an ECC adding section for adding a first error correction code (ECC) to each said plurality of first recording data and a second error correction code to each said plurality of second recording data, a data length of said first error correction code being longer than a data length of said second error correction code;

a sync block generating section for producing first sync block data by adding a synchronizing code and an identification code to each said plurality of first recording data whereto said first error correction code is added, and second sync block data by adding a synchronizing code and an identification code to each said plurality of second recording data whereto said second error correction code is added;

a selector for setting a selection between a first recording format and a second recording format; and a recording processor for executing a process of digital recording data output from said sync block generating section on said magnetic tape, wherein when said selector is set for said first recording format:
said tape driving unit drives said magnetic tape at a first speed; and
said sync block generating section outputs said first sync block data, and further wherein when said selector is set for said second recording format:
said tape driving unit drives said magnetic tape at a second speed that is faster than said first speed; and
said sync block generating section outputs said second sync block data.

10. The magnetic recording and reproducing apparatus of helical scanning type according to claim 9, further comprising a controller for controlling an output of said sync block generating section, wherein said controller controls in a manner that said first sync block data are recorded in (N−2) number of tracks excluding said two tracks at both ends of said N number of tracks when said selector is set for said first recording format.

11. The magnetic recording and reproducing apparatus of helical scanning type according to any one of claim 9 or claim 10, wherein a data length of said first error correction code is double a data length of said second error correction code.

12. The magnetic recording and reproducing apparatus of helical scanning type according to any one of claim 9 or claim 10, wherein a data length of said first recording data is longer than a data length of said second recording data.

13. The magnetic recording and reproducing apparatus of helical scanning type according to claim 12, wherein the data length of said first recording data is an integral multiple of the data length of said second recording data.

14. The magnetic recording and reproducing apparatus of helical scanning type according to claim 13, wherein the data length of said first recording data is double the data length of said second recording data.

* * * * *